United States Patent
Sennoun

(10) Patent No.: US 10,196,932 B2
(45) Date of Patent: Feb. 5, 2019

(54) OGV HEAT EXCHANGERS NETWORKED IN PARALLEL AND SERIAL FLOW

(71) Applicant: General Electric Company, Schenectady, NY (US)

(72) Inventor: Mohammed El Hacin Sennoun, West Chester, OH (US)

(73) Assignee: General Electric Company, Schenectady, NY (US)

( * ) Notice: Subject to any disclaimer, the term of this patent is extended or adjusted under 35 U.S.C. 154(b) by 299 days.

(21) Appl. No.: 14/962,070

(22) Filed: Dec. 8, 2015

(65) Prior Publication Data

US 2017/0159489 A1 Jun. 8, 2017

(51) Int. Cl.
*F01D 9/04* (2006.01)
*F01D 9/06* (2006.01)
(Continued)

(52) U.S. Cl.
CPC ............ *F01D 25/125* (2013.01); *F01D 9/04* (2013.01); *F01D 9/065* (2013.01); *F02C 7/14* (2013.01);
(Continued)

(58) Field of Classification Search
CPC . F01D 25/12; F01D 9/04; F01D 9/065; F02C 7/14; F02C 7/18; F02K 3/115; F05D 2240/12; F05D 2260/213
See application file for complete search history.

(56) References Cited

U.S. PATENT DOCUMENTS 2,474,258 A 6/1949 Kroon
4,542,623 A * 9/1985 Hovan ................. F01D 25/125
165/51
(Continued)

FOREIGN PATENT DOCUMENTS

CN 103362650 A 10/2013
EP 2 918 957 A1 9/2015
WO 2016/156743 A1 10/2016

OTHER PUBLICATIONS

Extended European Search Report and Opinion issued in connection with corresponding EP Application No. 16200675.3 dated Apr. 13, 2017.
(Continued)

*Primary Examiner* — William H Rodriguez
(74) *Attorney, Agent, or Firm* — General Electric Company; Brian Overbeck

(57) ABSTRACT

A gas turbine engine hybrid outer guide vane heat exchanger includes a circular row of fan outlet guide vanes, at least some of the fan outlet guide vanes being networked guide vane heat exchangers including heat exchangers within fan outlet guide vanes and guide vane heat exchangers fluidly interconnected both in series and in parallel. Group may include three or more of the guide vane heat exchangers fluidly connected both in series and in parallel. Two or more serial sets of the networked guide vane heat exchangers in the hybrid group may each include two or more of guide vane heat exchangers connected in series and two or more serial sets connected in parallel. First and second groups of the networked guide vane heat exchangers may include first and second groups for cooling engine lubrication system and/or integrated drive generator.

21 Claims, 6 Drawing Sheets

(51) Int. Cl.
    *F01D 25/12* (2006.01)
    *F02C 7/14* (2006.01)
    *F02C 7/18* (2006.01)
    *F02K 3/115* (2006.01)

(52) U.S. Cl.
    CPC ............... *F02C 7/18* (2013.01); *F02C 7/185* (2013.01); *F02K 3/115* (2013.01); *F05D 2240/12* (2013.01); *F05D 2240/50* (2013.01); *F05D 2260/213* (2013.01)

(56) References Cited

U.S. PATENT DOCUMENTS

| | | | | |
|---|---|---|---|---|
| 4,645,415 | A * | 2/1987 | Hovan | F01D 25/125 415/115 |
| 4,914,904 | A * | 4/1990 | Parnes | F01D 9/065 165/168 |
| 7,671,570 | B2 | 3/2010 | Larsen | |
| 7,900,438 | B2 | 3/2011 | Venkataramani et al. | |
| 8,333,552 | B2 | 12/2012 | Wood et al. | |
| 8,616,834 | B2 | 12/2013 | Knight, III et al. | |
| 8,973,465 | B2 | 3/2015 | Duong | |
| 2006/0042223 | A1 * | 3/2006 | Walker | F01D 9/065 60/39.08 |
| 2008/0219836 | A1 | 9/2008 | Decker et al. | |
| 2010/0196147 | A1 | 8/2010 | Schilling | |
| 2010/0236215 | A1 * | 9/2010 | Venkataramani | F01D 9/065 60/39.093 |
| 2013/0291514 | A1 | 11/2013 | Suciu et al. | |
| 2014/0165570 | A1 * | 6/2014 | Herring | F02C 7/14 60/730 |
| 2014/0209286 | A1 | 7/2014 | Freund et al. | |
| 2015/0023776 | A1 | 1/2015 | Ribarov et al. | |
| 2016/0305279 | A1 | 10/2016 | Gerstler et al. | |
| 2017/0204879 | A1 * | 7/2017 | Zaccardi | F04D 29/5853 |

OTHER PUBLICATIONS

First Office Action and Search issued in connection with corresponding CN Application No. 201611121444.6 dated Dec. 26, 2017.

* cited by examiner

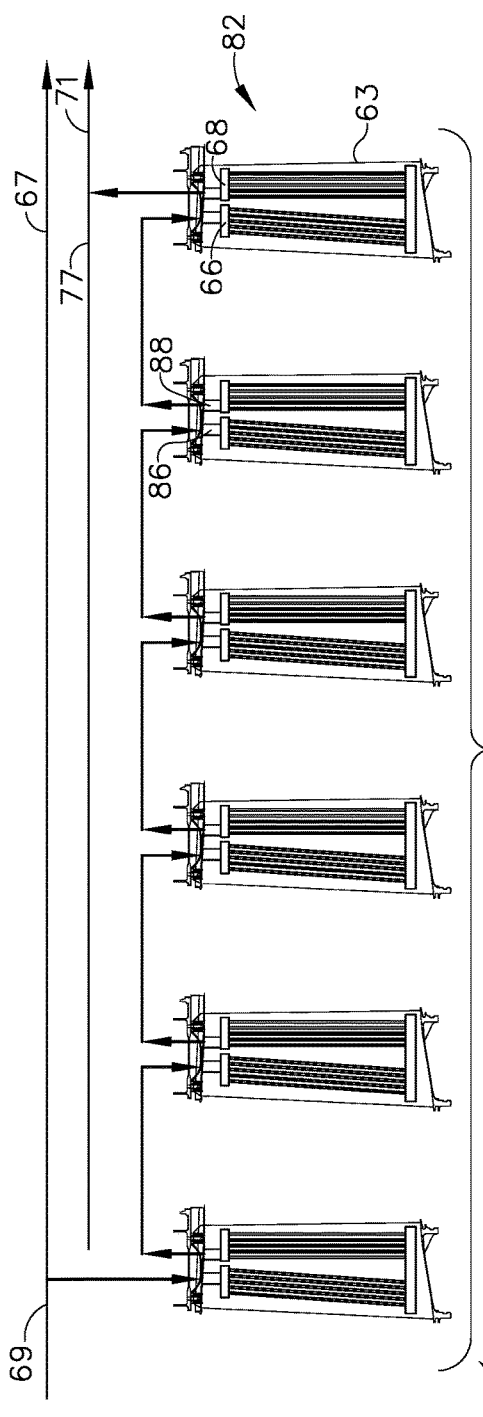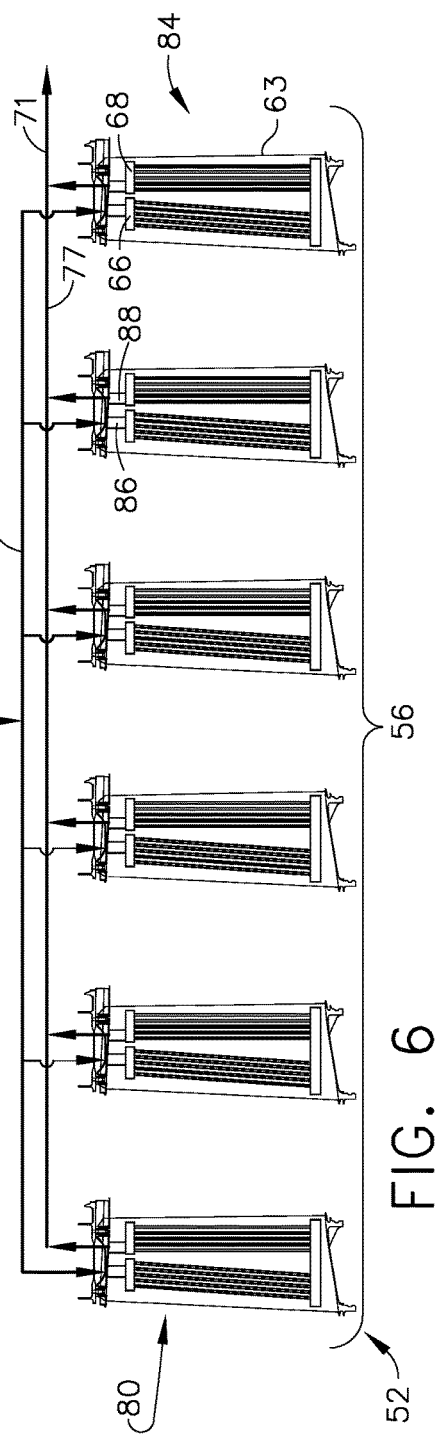

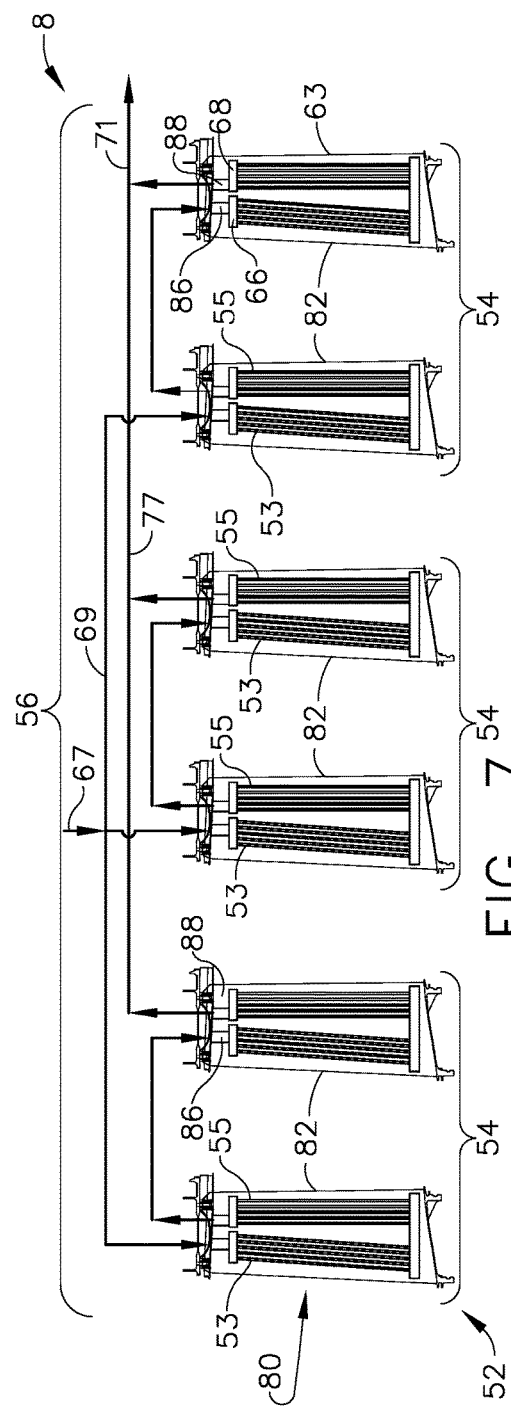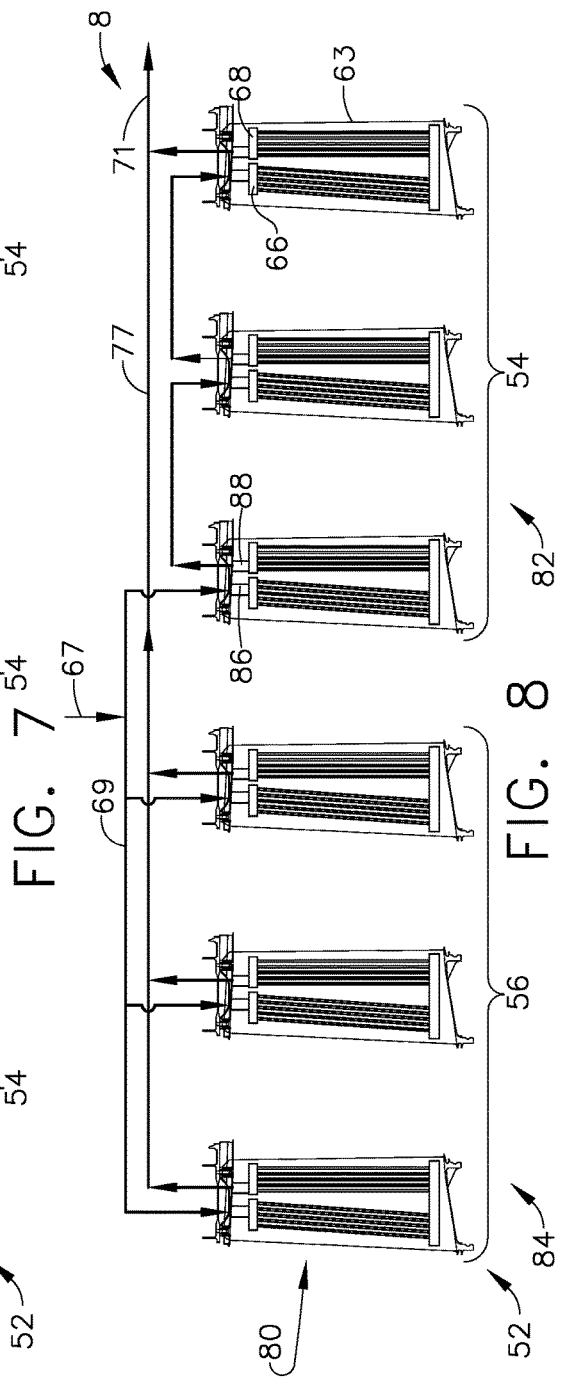

US 10,196,932 B2

OGV HEAT EXCHANGERS NETWORKED IN PARALLEL AND SERIAL FLOW

BACKGROUND OF THE INVENTION

Technical Field

The present invention relates generally to gas turbine engine turbine oil cooling and, more specifically, to outlet guide vanes containing heat exchangers used to cool the oil.

Background Information

Gas turbine engines are commonly provided with a circulating oil system for lubricating and cooling various engine components such as bearings, gearboxes, electrical generators, and the like. In operation, the oil absorbs a substantial amount of heat that must be rejected to the external environment in order to maintain the oil at acceptable temperatures. Electric generator oil cooling typically uses one or more air-to-oil heat exchangers sometimes in series with fuel-to-oil heat exchangers and fuel return-to-tank systems in a complex cooling network.

Compact heat exchangers also known as brick coolers or surface coolers have been used for this cooling but both have a fan air drag penalty. Oil cooling circuits have been suggested that include air-to-oil heat exchangers in vanes in the engine and, in particular, in fan outlet guide vanes (OGVs). The use of OGVs as heat exchangers is a zero fan air pressure loss across the OGVs because oil is routed within the OGVs. Because the OGVs are not finned (less exchange area is available versus a brick cooler or a surface cooler), many OGVs will be needed to cool engine oil or electric generator oil. Routing oil in tiny channels inside an OGV is not free and can be done via oil pressure drop inside OGV channels. A typical air-oil cooler has 50 psid of pressure budget and, as mentioned above, using many OGVs will require much more oil pressure drop than what is currently available or budgeted in an oil lubrication system or an integrated drive generator (IDG) or variable frequency generator (VFG) oil system. Thus, oil cooling systems and circuits using many OGVs as heat exchangers and able to meet air-oil coolers oil pressure drop requirements is greatly needed.

SUMMARY OF THE INVENTION

A gas turbine engine hybrid outer guide vane heat exchanger apparatus includes a circular row of fan outlet guide vanes, at least some of the fan outlet guide vanes being networked guide vane heat exchangers including heat exchangers within at least some of the fan outlet guide vanes, and the guide vane heat exchangers being networked and fluidly interconnected both in series and in parallel.

The hybrid group of networked guide vane heat exchangers may include three or more of the guide vane heat exchangers fluidly connected both in series and in parallel.

The apparatus may include two or more serial sets of the networked guide vane heat exchangers in the hybrid group and each of the serial sets including two or more of the guide vane heat exchangers connected in series and the two or more serial sets connected in parallel.

The apparatus may include two or more serial sets of the networked guide vane heat exchangers in the hybrid group, each of the serial sets including two or more of the guide vane heat exchangers connected in series and one or more parallel sets of the networked guide vane heat exchangers in the hybrid group and each of the one or more parallel sets including two or more of the guide vane heat exchangers and at least one of the serial sets connected in parallel.

Each of the heat exchangers may include an oil circuit extending from an oil inlet manifold to an oil outlet manifold and operative for directing oil through the heat exchanger.

The apparatus may include an oil supply line including or connected to an annular oil supply manifold, the annular oil supply manifold connected in oil supply flow relationship to the hybrid group of the networked guide vane heat exchangers, an oil return line including or connected to an annular oil return manifold, and the annular oil return manifold connected in oil return flow relationship to the hybrid group of the networked guide vane heat exchangers.

A gas turbine engine may include the gas turbine engine hybrid outer guide vane heat exchanger apparatus and the circular row of fan outlet guide vanes extending across a fan flowpath between an annular fan casing and a hub located radially inwardly of the fan casing.

The OGV heat exchangers may be fluidly connected for cooling oil for the engine's lubrication system including bearings and/or for an integrated drive generator oil system.

The engine may include first and second groups of the one or more hybrid groups of networked guide vane heat exchangers, the first group operably connected to a lubrication system of the engine for provide cooling for the lubrication system, and the second group operably connected to a variable frequency generator and/or an integrated drive generator for provide cooling for the variable frequency generator and/or integrated drive generator.

BRIEF DESCRIPTION OF THE DRAWINGS

The invention, in accordance with preferred and exemplary embodiments, is more particularly described in the following detailed description taken in conjunction with the accompanying drawings in which:

FIG. 5 is a schematical view illustration of a group of guide vane heat exchangers fluidly connected in series.

FIG. 6 is a schematical view illustration of a group of guide vane heat exchangers fluidly connected in parallel.

FIG. 7 is a schematical view illustration of a hybrid group of guide vane heat exchangers having fluidly connected in series and in parallel with sets of guide vane heat exchangers fluidly connected in parallel and the parallel sets fluidly connected in series.

FIG. 8 is a schematical view illustration of a hybrid group with a set of guide vane heat exchangers fluidly connected in parallel followed by a set of guide vane heat exchangers fluidly connected in series.

DESCRIPTION

Figure 1:
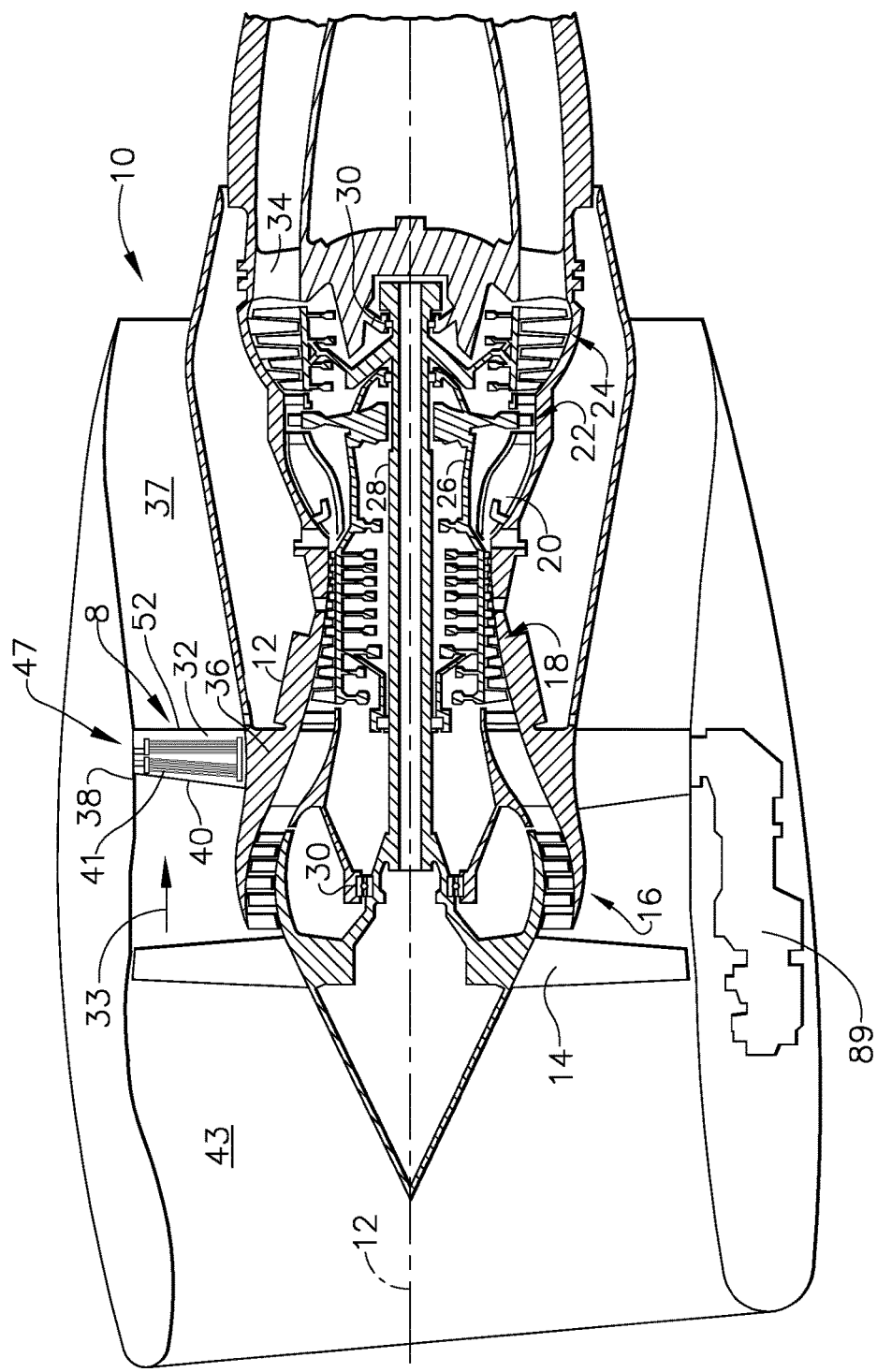
FIG. 1 is a schematic cross-sectional view illustration of a gas turbine engine incorporating a guide vane heat exchanger system.
Figure 2:
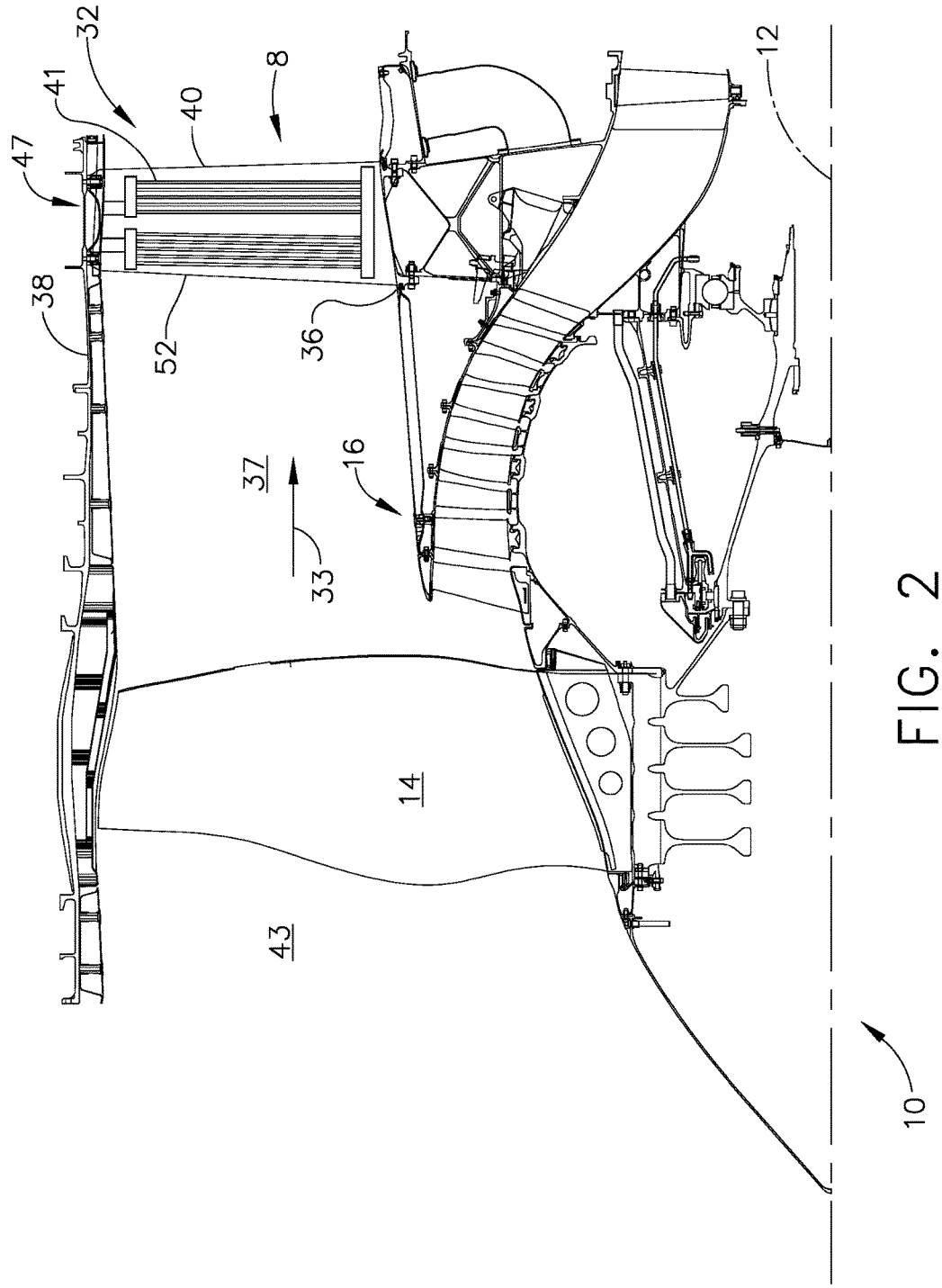
FIG. 2 is an enlarged view of a portion of the gas turbine engine of FIG. 1.
Figure 9:
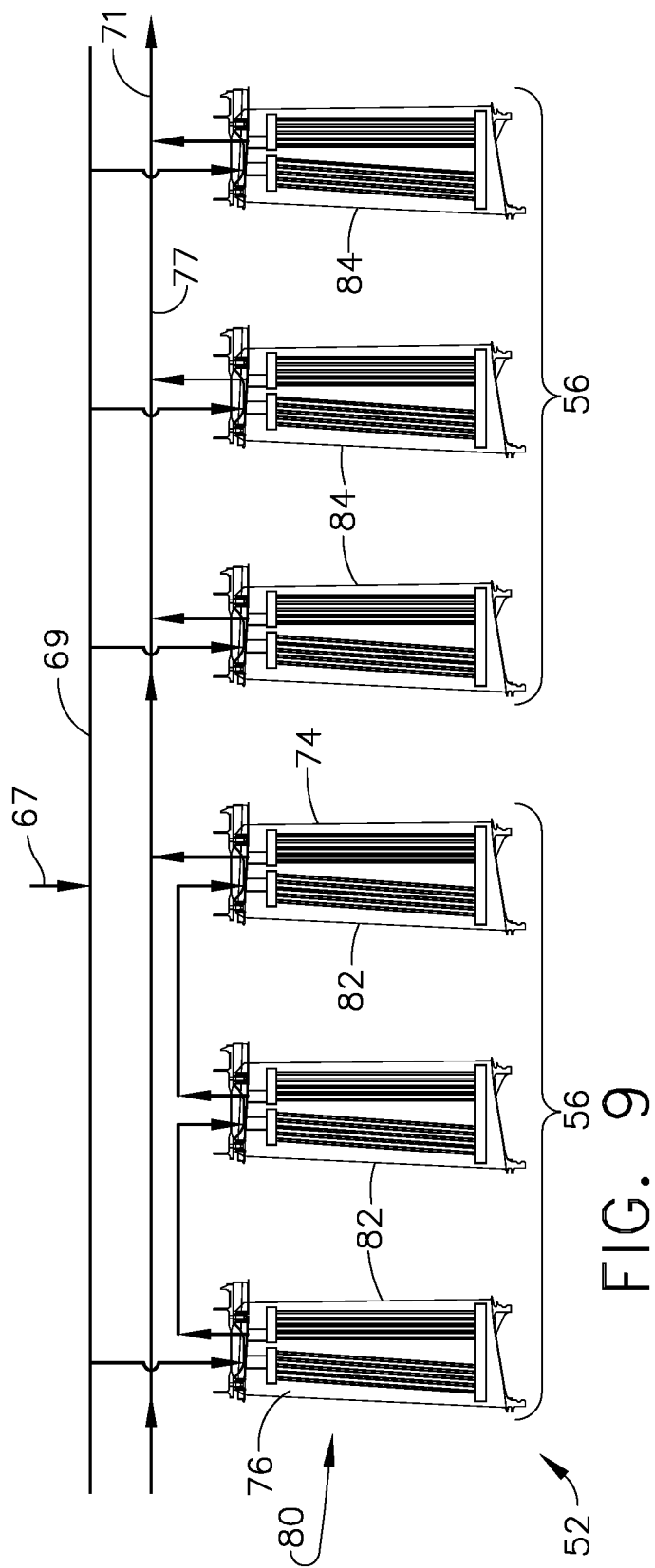
FIG. 9 is a schematical view illustration of a hybrid group with a set of guide vane heat exchangers fluidly connected in series followed by a set of guide vane heat exchangers fluidly connected in parallel.

Illustrated in FIGS. 1 and 2 is a gas turbine engine 10 incorporating a hybrid outer guide vane heat exchanger apparatus 8 including at least one hybrid group 80 of networked guide vane heat exchangers 52 fluidly connected or networked in series 54 and in parallel 56 as illustrated in FIGS. 7-9. The engine 10 is circumscribed about a longitudinal centerline or axis 12. The engine 10 includes, in downstream serial flow relationship, a fan 14, booster 16, compressor 18, combustor 20, high pressure turbine 22, and low pressure turbine 24. An outer shaft 26 drivingly connects the high pressure turbine to the compressor 18. An inner shaft 28 drivingly connects the low pressure turbine 24 to the fan 14 and the booster 16. The inner and outer shafts 28, 26 are rotatably mounted in bearings 30 which are themselves mounted in a fan frame 32 and a turbine rear frame 34.

The fan frame 32 includes a radially inner hub 36 connected to a radially outer annular fan casing 38 by an annular array or assembly 39 of radially extending fan outlet guide vanes ("OGVs") 40 (further illustrated in FIG. 3) which extend across a fan flowpath 43. The fan OGVs 40 are downstream and aft of the fan 14 and aft of the booster 16. The exemplary embodiment of the fan OGVs 40 illustrated herein are arrayed in a circular row 47 as more particularly illustrated in FIG. 3. The exemplary embodiment of the engine 10 illustrated herein includes the OGVs 40 providing aerodynamic turning of fan airflow 33 passing through a fan bypass duct 37 and structural support for the fan casing 38. Alternative embodiments may provide separate vanes and struts for aerodynamic and structural functions.

Figure 4:
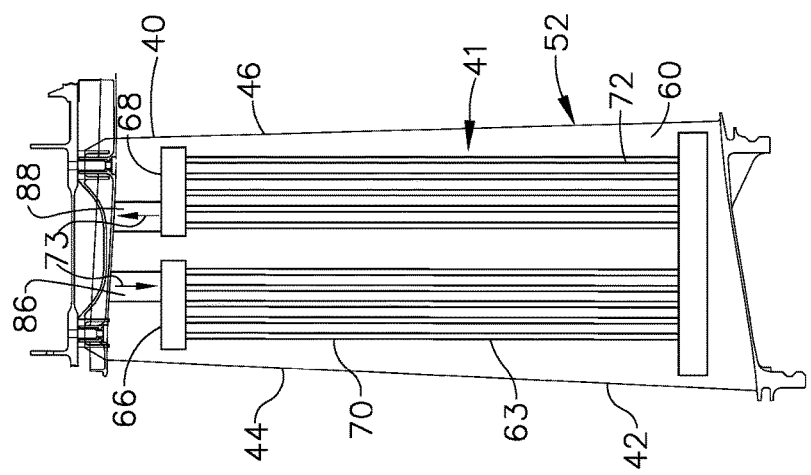
FIG. 4 is a schematical view illustration of an oil circuit in the guide vane heat exchanger illustrated in FIG. 2.

Some or all of the fan OGVs 40 in the engine 10 include heat exchangers 41 therein which may be integrated into the structure of the OGV 40 as illustrated in FIG. 4. The guide vane heat exchangers 52 includes the heat exchangers 41 within the fan OGVs 40. The OGV heat exchangers 41 are used to cool oil for the engine's lubrication system for the bearings and/or for a variable frequency generator (VFG) or an integrated drive generator 89 (IDG) oil system. One or more of the hybrid groups 80 of networked guide vane heat exchangers 52 may be used to provide cooling for different engine systems or accessories. One example of this is a first hybrid group 80 of networked guide vane heat exchangers 52 may be used to provide cooling for the engine's lubrication system such as for the bearings and a second hybrid group 80 of networked guide vane heat exchangers 52 may be used to provide cooling for a variable frequency generator (VFG) or an integrated drive generator 89 (IDG).

FIG. 4 illustrates an exemplary embodiment of one of the heat exchangers 41 in one of the fan OGVs 40 in more detail. The OGV comprises an airfoil 42 having a leading edge 44, a trailing edge 46, a tip 48, a root 50, a convex suction side 58, and a concave pressure side 60. Each OGV heat exchanger 41 includes an OGV oil circuit 63 extending from an oil inlet manifold 66 to an oil outlet manifold 68 and directs oil through the OGV heat exchanger 41 when the engine 10 is running. Each of the OGV heat exchangers 41 includes an oil supply inlet 86 for receiving oil flowed into the oil inlet manifold 66. Each of the OGV heat exchangers 41 includes an oil supply outlet 88 to for discharging oil flowed out of the oil outlet manifold 68.

An exemplary embodiment of the OGV oil circuit 63, illustrated in FIG. 4, includes a plurality of fluid inlet passages 70 extending from the oil inlet manifold 66 into the OGV heat exchanger 41. The plurality of fluid inlet passages 70 are fluidly connected to a plurality of fluid outlet passages 72 extending to the oil outlet manifold 68 for directing an oil flow 73 out of the OGV heat exchanger 41.

Figure 3:
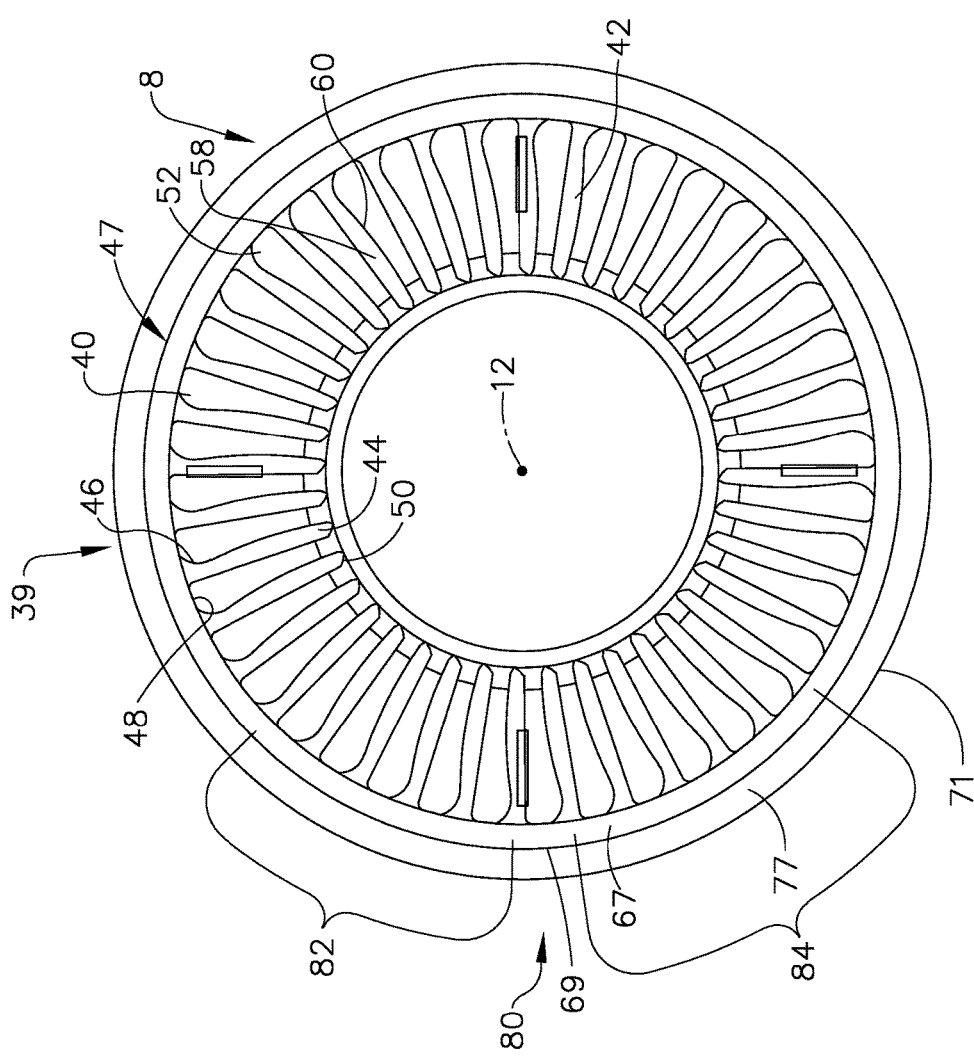
FIG. 3 is an axial schematical view illustration of a fan outlet guide vane assembly illustrated in FIG. 1.

The plurality of the guide vane heat exchangers 52 may be networked and fluidly interconnected both in series 54 as illustrated in FIG. 5 and in parallel 56 as illustrated in FIG. 6. The guide vane heat exchangers 52 may be arranged in serial sets 82 and parallel sets 84 as illustrated in FIG. 3 and all the guide vane heat exchangers 52 networked and fluidly interconnected both in series 54 and parallel 56. FIGS. 3 and 5-9 illustrate an oil supply line 67 including or connected to an annular oil supply manifold 69 connected in oil supply flow relationship to the one or more hybrid groups 80 of networked guide vane heat exchangers 52.

FIGS. 3 and 5-9 also illustrate an oil return line 71 including or connected to an annular oil return manifold 77 connected in oil return flow relationship to the hybrid group 80 of networked guide vane heat exchangers 52. All the guide vane heat exchangers 52 in the parallel sets 84 receive oil individually and directly from the annular oil supply manifold 69 and the oil supply line 67. All the guide vane heat exchangers 52 in the parallel sets 84 return oil individually and directly to the annular oil return manifold 77 and the oil return line 71. A first one 76 of the guide vane heat exchangers 52 in each of the serial sets 82 receives oil from directly from the annular oil supply manifold 69 and the oil supply line 67 and the rest receive oil from the previous one. A last one 74 of the guide vane heat exchangers 52 in each of the serial sets 82 or the one most downstream returns the oil directly to the annular oil return manifold 77 and the oil return line 71. The annular oil return manifold 77 and the annular oil supply manifold 69 circumscribed around the annular fan casing 38.

FIG. 7 illustrates an exemplary hybrid group 80 of networked guide vane heat exchangers 52 including three or more of the guide vane heat exchangers 52 fluidly connected both in series 54 and in parallel 56. Illustrated in FIG. 7 are three serial sets 82, each of the serial sets 82 are illustrated as pairs of the guide vane heat exchangers 52 connected in series. The three serial sets 82 of the guide vane heat exchangers 52 are fluidly connected in parallel 56 through the oil outlet manifold 68 and oil return line 71. Within each of the serial sets 82 is one upstream most and there is one downstream most heat exchangers 53, 55 fluidly connected to each other in series 54. The downstream most heat exchangers 55 in each of the serial sets 82 of the guide vane heat exchangers 52 are fluidly connected in parallel 56. Each of the serial sets 82 or pairs of the guide vane heat exchangers 52 is fluidly connected in series 54 to a corresponding one of the guide vane heat exchangers 52 fluidly connected in parallel 56. All of the oil flowed into the hybrid outer guide vane heat exchanger apparatus 8 is flowed into the series sets 82 of the guide vane heat exchangers 52 fluidly connected in series 54. All of the oil flowed out of the hybrid outer guide vane heat exchanger apparatus 8 is flowed out of the guide vane heat exchangers 52 fluidly connected in parallel 56 through the oil outlet manifold 68.

The oil supply line 67 includes the annular oil supply manifold 69 connected to the oil inlet manifold 66 of the upstream most heat exchanger 53 of the serial sets 82. The oil return line 71 includes an annular oil return manifold 77 connected to the oil outlet manifold 68 of the downstream most heat exchanger 55 of the serial sets 82. This places the serial sets 82 in parallel flow. The exemplary hybrid group 80 of the guide vane heat exchangers 52 illustrated in FIG. 7 includes serial sets 82 of the guide vane heat exchangers 52 and the serial sets 82 fluidly interconnected in parallel 56.

The hybrid group 80 of the guide vane heat exchangers 52 having both two or more of the guide vane heat exchangers 52 fluidly connected both in series 54 and in parallel 56 helps reduce a pressure drop across the outer guide vane heat exchanger apparatus 8 and helps meet oil cooling requirements of the outer guide vane heat exchanger apparatus 8. The hybrid group 80 eliminates additional fan air losses because there are no additional cooling elements such as brick or surface coolers to contribute to the fan air loss. Because the use of guide vane heat exchangers 52 eliminates the need for a surface or brick cooler and, thus, provides a specific fuel consumption (SFC) gain which indicates an improvement in fuel economy and engine efficiency. Further, this arrangement of OGVs eliminates the need for an oil reservoir in the engine hub. Oil circulates in through the OGV network and is output to the engine.

FIG. 8 illustrates a hybrid group 80 of networked guide vane heat exchangers 52 including a parallel set 84 of guide vane heat exchangers 52 fluidly connected in parallel followed by a serial set 82 of guide vane heat exchangers 52 fluidly connected in series. The parallel and serial sets 84, 82 are separately supplied with oil from and connected in oil supply flow relationship to the annular oil supply manifold 69 and the oil supply line 67. All of the guide vane heat exchangers 52 in the parallel set 84 of guide vane heat exchangers 52 are individually directly connected in oil return flow relationship to the annular oil return manifold 77 and the oil return line 71.

FIG. 9 illustrates a hybrid group 80 of networked guide vane heat exchangers 52 including a serial set 82 of guide vane heat exchangers 52 fluidly connected in series 54 followed by a parallel set 84 of guide vane heat exchangers 52 fluidly connected in parallel 56. The guide vane heat exchangers 52 in the serial set 82 are supplied with oil from and connected in oil supply flow relationship to the annular oil supply manifold 69 and the oil supply line 67. The guide vane heat exchangers 52 in the serial set 82 are separately and individually supplied with oil from and connected in oil supply flow relationship to the annular oil supply manifold 69 and the oil supply line 67. The first one 76 of the guide vane heat exchangers 52 in the serial set 82 receives oil from directly from the annular oil supply manifold 69 and the oil supply line 67 and the rest receive oil from the previous one and the last one 74 or the one most downstream returns the oil to the annular oil return manifold 77 and the oil return line 71. All of the guide vane heat exchangers 52 in the parallel set 84 of guide vane heat exchangers 52 are individually directly connected in oil return flow relationship to the annular oil return manifold 77 and the oil return line 71.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A gas turbine engine hybrid outer guide vane heat exchanger apparatus comprising:
    a circular row of fan outlet guide vanes,
    one or more hybrid groups of networked guide vane heat exchangers including at least some of the fan outlet guide vanes,
    the networked guide vane heat exchangers including heat exchangers within the at least some of the fan outlet guide vanes, the guide vane heat exchangers being networked and fluidly interconnected both in series and in parallel,
    an oil supply line including or connected to an annular oil supply manifold,
    the annular oil supply manifold connected in oil supply flow relationship to the hybrid group of the networked guide vane heat exchangers,
    an oil return line including or connected to an annular oil return manifold, and
    the annular oil return manifold connected in oil return flow relationship to the hybrid group of the networked guide vane heat exchangers.

2. The apparatus as claimed in claim 1, further comprising each one of the hybrid groups of networked guide vane heat exchangers including three or more of the guide vane heat exchangers fluidly connected both in series and in parallel.

3. The apparatus as claimed in claim 1, further comprising:
    two or more serial sets of the networked guide vane heat exchangers in each one of the hybrid groups,
    each of the serial sets including two or more of the guide vane heat exchangers connected in series, and
    the two or more serial sets connected in parallel.

4. The apparatus as claimed in claim 1, further comprising:
    two or more serial sets of the networked guide vane heat exchangers in each one of the hybrid groups,
    each of the serial sets including two or more of the guide vane heat exchangers connected in series,
    one or more parallel sets of the networked guide vane heat exchangers in the hybrid group, and
    each of the one or more parallel sets including two or more of the guide vane heat exchangers and at least one of the serial sets connected in parallel.

5. The apparatus as claimed in claim 1, further comprising each of the heat exchangers including an oil circuit extending from an oil inlet manifold to an oil outlet manifold and operative for directing oil through the heat exchanger.

6. The apparatus as claimed in claim 1, further comprising:
    two or more serial sets of the networked guide vane heat exchangers in the hybrid group,
    each of the serial sets including two or more of the guide vane heat exchangers connected in series,
    one or more parallel sets of the networked guide vane heat exchangers in the hybrid group, and
    each of the one or more parallel sets including two or more of the guide vane heat exchangers connected in parallel.

7. The apparatus as claimed in claim 6, further comprising:
    a first one of the guide vane heat exchangers in each of the serial sets directly fluidly connected to the annular oil supply manifold,
    a last one of the guide vane heat exchangers in each of the serial sets directly fluidly connected to the annular oil return manifold, and
    all of the guide vane heat exchangers in the one or more parallel sets directly fluidly connected to the annular oil supply manifold and the oil return line.

8. The apparatus as claimed in claim 1,
further comprising:
    a first one of the guide vane heat exchangers in each of the serial sets directly fluidly connected to the annular oil supply manifold, and
    a last one of the guide vane heat exchangers in each of the serial sets directly fluidly connected to the annular oil return manifold.

9. A gas turbine engine comprising:
    a hybrid outer guide vane heat exchanger apparatus including a circular row of fan outlet guide vanes extending across a fan flowpath between an annular fan casing and a hub located radially inwardly of the fan casing, one or more hybrid groups of networked guide vane heat exchangers including at least some of the fan outlet guide vanes, the guide vane heat exchangers being networked and fluidly interconnected both in series and in parallel, an oil supply line including or connected to an annular oil supply manifold, the annular oil supply manifold connected in oil supply flow relationship to the hybrid group of the networked guide vane heat exchangers, an oil return line including or connected to an annular oil return manifold, and the annular oil return manifold connected in oil return flow relationship to the hybrid group of the networked guide vane heat exchangers.

10. The engine as claimed in claim 9, further comprising the hybrid group of networked guide vane heat exchangers including three or more of the guide vane heat exchangers fluidly connected both in series and in parallel.

11. The engine as claimed in claim 9, further comprising:
two or more serial sets of the networked guide vane heat exchangers in the hybrid group,
each of the serial sets including two or more of the guide vane heat exchangers connected in series, and
the two or more serial sets connected in parallel.

12. The engine as claimed in claim 9, further comprising:
two or more serial sets of the networked guide vane heat exchangers in the hybrid group,
each of the serial sets including two or more of the guide vane heat exchangers connected in series,
one or more parallel sets of the networked guide vane heat exchangers in the hybrid group, and
each of the one or more parallel sets including two or more of the guide vane heat exchangers and at least one of the serial sets connected in parallel.

13. The engine as claimed in claim 9, further comprising each of the heat exchangers including an oil circuit extending from an oil inlet manifold to an oil outlet manifold and operative for directing oil through the heat exchanger.

14. The engine as claimed in claim 9, further comprising:
two or more serial sets of the networked guide vane heat exchangers in the hybrid group,
each of the serial sets including two or more of the guide vane heat exchangers connected in series,
one or more parallel sets of the networked guide vane heat exchangers in the hybrid group, and
each of the one or more parallel sets including two or more of the guide vane heat exchangers connected in parallel.

15. The engine as claimed in claim 14, further comprising:
a first one of the guide vane heat exchangers in each of the serial sets directly fluidly connected to the annular oil supply manifold,
a last one of the guide vane heat exchangers in each of the serial sets directly fluidly connected to the annular oil return manifold, and
all of the guide vane heat exchangers in the one or more parallel sets directly fluidly connected to the annular oil supply manifold and the oil return line.

16. The engine as claimed in claim 9, further comprising:
a first one of the guide vane heat exchangers in each of the serial sets directly fluidly connected to the annular oil supply manifold, and
a last one of the guide vane heat exchangers in each of the serial sets directly fluidly connected to the annular oil return manifold.

17. The engine as claimed in claim 9, further comprising:
a first one of the guide vane heat exchangers in each of the serial sets directly fluidly connected to the annular oil supply manifold, and
a last one of the guide vane heat exchangers in each of the serial sets directly fluidly connected to the annular oil return manifold.

18. The engine as claimed in claim 9, further comprising the outer guide vane heat exchanger apparatus fluidly connected for cooling oil for the engine's lubrication system including bearings and/or for an integrated drive generator oil system.

19. The engine as claimed in claim 9, further comprising:
first and second groups of the one or more hybrid groups of networked guide vane heat exchangers,
the first group operably connected to a lubrication system of the engine for provide cooling for the lubrication system, and
the second group operably connected to a variable frequency generator and/or an integrated drive generator for provide cooling for the variable frequency generator and/or integrated drive generator.

20. The engine as claimed in claim 19, further comprising each of the first and second groups of networked guide vane heat exchangers including three or more of the guide vane heat exchangers fluidly connected both in series and in parallel.

21. The engine as claimed in claim 19, further comprising:
two or more serial sets of the networked guide vane heat exchangers in each of the first and second groups,
each of the serial sets including two or more of the guide vane heat exchangers connected in series, and
the two or more serial sets connected in parallel.

* * * * *